(12) United States Patent
Morin

(10) Patent No.: US 8,746,281 B2
(45) Date of Patent: Jun. 10, 2014

(54) VALVE AND METHOD OF MAKING SAME

(75) Inventor: Jeremy Morin, Canal Fulton, OH (US)

(73) Assignee: Sonoco Development Inc., Hartsville, SC (US)

( * ) Notice: Subject to any disclaimer, the term of this patent is extended or adjusted under 35 U.S.C. 154(b) by 1069 days.

(21) Appl. No.: 12/613,618

(22) Filed: Nov. 6, 2009

(65) Prior Publication Data

US 2011/0108752 A1 May 12, 2011

(51) Int. Cl.
*F16K 15/14* (2006.01)
*B65D 77/22* (2006.01)
*B32B 27/36* (2006.01)
*B32B 3/26* (2006.01)

(52) U.S. Cl.
CPC .............. *B65D 77/225* (2013.01); *B32B 27/36* (2013.01); *B32B 3/266* (2013.01)
USPC ...................... 137/852; 220/89.1; 220/203.11; 383/103

(58) Field of Classification Search
USPC ............... 137/516.11, 852; 220/89.1, 203.11, 220/203.15, 203.16, 203.18; 383/103
See application file for complete search history.

(56) References Cited

U.S. PATENT DOCUMENTS

| | | | | |
|---|---|---|---|---|
| 3,799,427 A | * | 3/1974 | Goglio | 383/103 |
| 4,964,852 A | * | 10/1990 | Dunning et al. | 604/75 |
| 5,869,009 A | * | 2/1999 | Bellefeuille et al. | 422/171 |
| 6,874,484 B2 | * | 4/2005 | Benjey | 123/520 |
| 7,178,555 B2 | | 2/2007 | Engel et al. | |
| 7,328,543 B2 | | 2/2008 | Hoffman et al. | |
| 7,490,623 B2 | | 2/2009 | Rypstra | |
| 2006/0096982 A1 | | 5/2006 | Gunter et al. | |
| 2008/0041663 A1 | | 2/2008 | Hoffman et al. | |

FOREIGN PATENT DOCUMENTS

| | | |
|---|---|---|
| DE | 35 21 373 A1 | 12/1986 |
| EP | 0 209 729 A2 | 1/1987 |
| WO | WO 2006/075758 A1 | 7/2006 |
| WO | WO 2007/113097 A1 | 10/2007 |

OTHER PUBLICATIONS

International Search Report—PCT/US2010/054504, Feb. 22, 2011, Sonoco Development.
Written Opinion—PCT/US2010/054504, Feb. 22, 2011, Sonoco Development.

* cited by examiner

*Primary Examiner* — Kevin Lee
*Assistant Examiner* — P. Macade Nichols
(74) *Attorney, Agent, or Firm* — Womble Carlyle Sandridge & Rice LLP

(57) ABSTRACT

A method of making a one-way gas release valve for releasing gas pressure from within a coffee container comprises pre-oiling a relatively narrow dry strap of flexible material and laminating the pre-oiled dry strap between relatively wide ribbons of base and cover material with the dry strap overlying spaced vent patterns in the base material. Alternatively, the base material may be pre-oiled or both the base material and the dry strap may be pre-oiled. The dry strap and base may be made of PET and the cover may be made of mPET. Gas release valves are then die cut from the resulting web with each valve containing a vent pattern. Pre-oiling of the dry strap and/or the base can be accomplished through a roll metered process to insure that the oil is applied in precise amounts and with consistent thickness and coverage. Since the oil is applied during fabrication of the gas release valves, the vent patterns in the base can be configured to function also as a filter to prevent coffee grinds from migrating into the valve.

16 Claims, 3 Drawing Sheets

VALVE AND METHOD OF MAKING SAME

TECHNICAL FIELD

This disclosure relates generally to valves, and more specifically to one-way gas release valves of the type typically used to maintain freshness of commodities such as coffee by allowing excess gas pressure within a container to vent to the atmosphere while preventing air from entering the container.

BACKGROUND

One-way gas release valves for maintaining freshness of coffee within a can or other container have long been available. These valves generally are configured to be adhered to the surface of a membrane end that seals the mouth of a coffee container until an end user desires to open the container. The valve covers a small vent hole formed in the membrane end. The valve allows gas pressure within the container to escape when it is higher than ambient pressure while preventing ingress of outside air when ambient pressure is higher than gas pressure within the container. Gas release valves can take on a variety of configurations, but one conventional gas release valve is generally square in shape and includes a base, typically formed of a polyethylene terephthalate (PET) polyester film, having a pressure sensitive adhesive on its bottom face for attachment to the membrane end of a coffee container. A central hole is punched through the base and the pressure sensitive adhesive layer and is sized to surround the small vent hole formed in the membrane end when the valve is applied. A dry strap, which also may be formed of PET film, is wider than the diameter of the hole but narrower than the valve body, and extends across the top surface of the base and covers the hole. A thin film of oil is disposed between the dry strap and the base. An adhesive layer, which may, for instance, be a double sided tape, covers the dry strap and the top surface of the base to secure the dry strap in place atop the hole. A barrier layer, which may be a metalized polyethylene terephthalate (mPET) film, is secured to the opposite side of the adhesive layer forming a cover and protective layer, and helping to bond the dry strap to the base.

In operation, when atmospheric pressure is greater than the gas pressure within the container, the force of the outside pressure urges the dry strap down against the opening in the base. This, in conjunction with the wetting forces provided by the oil film, seals off the opening and prevents air from entering the container through the opening. Gas pressure within the container may become greater than atmospheric pressure due, for instance, to off-gassing from the coffee within the container, a change in barometric pressure, or a change in altitude during shipment. When this occurs, the gas pressure within the container urges the dry strap away from the opening in the base and overcomes the wetting force of the oil, which allows excess gas in the container to flow along the dry strap to the edges of the valve, where it escapes to the atmosphere. In this way, gas pressure within the container is always maintained at or below atmospheric pressure and the container is sealed against ingress of outside air.

In order for the dry strap form a reliable seal around the hole in the base, a very thin film of oil, such as silicone oil, is deposited on the dry strap between the dry strap and the base. This thin film of oil creates a wetting force between the oil and the films of the base and the dry strap and has an inherent surface tension that helps to close and seal the valve when the pressure within the container equalizes with the atmospheric pressure. Traditionally, the oil is applied to the dry strap after the valve is fabricated in a semi-continuous process that involves indexing a long ribbon bearing thousands of valves and micro-spraying milligrams of oil into each valve through the hole in its base. While somewhat successful, this process has proven difficult to control precisely; because, among other things, of the inherent difficulty spraying the correct very small amount of oil into each valve (2.9 milligrams is difficult to control), timing and aligning the spray to the hole in the base, and achieving uniform lay down of oil across the entire dry strap. Variations in these factors lead to corresponding variations in the characteristics of the oil film and consequently in valve performance which, in some cases, can be unacceptable.

An additional and related problem with traditional gas release valves has been that the hole in the base of these valves must be large enough to allow for effective micro-spraying or other application of oil through the hole. However, when the valve is applied to the membrane end of a coffee container, this relatively large hole can allow coffee grinds that migrate through the vent hole in the membrane to become lodged between the dry strap and the base rendering the valve ineffective to seal out ambient air.

Accordingly, there exists an need for a method of making one-way gas release valves for coffee containers with membrane ends, and containers of other commodities, that insures precise application of a tiny volume of oil to each valve, uniform lay down of oil across the entire dry strap, and that eliminates the need to index, align, and apply small volumes of oil through the holes of valves. A further need exists for a one-way gas release valve that is immune to the migration of coffee grinds from a coffee container into the valve. It is to the provision of such a method and resulting valve that the present invention is primarily directed.

SUMMARY

Briefly described, the present invention, in one preferred embodiment thereof, comprises a one-way gas relief valve for use on coffee containers and other commodity containers and a method of making said valve. The invention will be described herein within the context of gas release valves for application to membrane ends of rigid coffee containers such as coffee cans Such membrane ends are generally formed of a metalized film and function to seal the mouth of the container until the end user opens the container by peeling off the membrane end. It should be understood, however, that the invention is not limited to use with such coffee containers, but may also be applied directly to coffee bags and has application to a variety of containers for any commodity where one-way gas release from the container is desired.

In general, the method, in a preferred embodiment, comprises continuously laminating the various layers of material and adhesive to form a ribbon that is die cut to form individual valves. More specifically, a ribbon of mPET is drawn from a roll and progressively advanced along a path having an upstream end and a downstream end. As the ribbon advances, a strip of double sided tape is laminated to the mPET ribbon at a taping station and the ribbon and tape advance downstream along the path. A relatively narrower strip of dry strap material is drawn from a roll and advanced toward the path to be laminated to the exposed face of the double sided tape previously applied to the mPET ribbon. As the dry strap advances, a thin, even coating or film of silicone oil is continuously applied to the dry strap on the side opposite the side to be laminated to the double sided tape. Application of the oil is done in a very controllable manner such as, for example, by a roll metered process controlled by a gravure or analox cylinder. This insures that a precise amount of oil is applied to the dry strap and that the resulting layer of oil is of consistent thickness and coverage. An automated vision system can be employed if desired to confirm the quality of the oil application. The opposite face of the oiled dry strap is then progressively brought into contact with and laminated to the double sided tape, forming an upper pre-lamination.

A web or ribbon of base material that has been coated with a pressure sensitive adhesive and laminated to a release liner forms a lower pre-lamination. The lower pre-lamination is drawn from a roll and passes through a die cutter, which cuts out a vent pattern, which may be a hole, slits, or another configuration, at spaced intervals along the length of the lower pre-lamination. The lower pre-lamination is then progressively brought into engagement with and laminated to the upper pre-lamination with the still exposed portions of the double sided tape on the upper pre-lamination bonding to the base on either side of the dry strap. The pre-oiled face of the dry strap engages the base material covering the vent patterns formed therealong. The completed lamination is then kiss cut down to the release liner at the vent patterns to form a ribbon of finished one-way gas release valves, which may be applied, for example, to the membrane ends of coffee containers in the usual manner.

Numerous variations of this process are possible, including printing the oil onto the base material rather than on the dry strap and changing the sequence in which the various steps are performed.

Thus, an improved method is now provided wherein oil is applied to one-way gas release valves during the valve fabrication process and in such a way that the amount, thickness, and coverage of the oil is highly controllable and extremely consistent. The resulting valves therefore perform with greater predictability and reliability than traditional gas release valves. Further, since the need to oil the valves through their bottom holes before application is eliminated, the bottom holes may be replaced with a vent pattern, which still allows gas flow but blocks the passage of coffee grinds into the valve. Thus, valve failure due to ingestion of foreign material is virtually eliminated. These and other aspects, features, and advantages of the method and valve of this invention will become more apparent upon review of the detailed description set forth below, when taken in conjunction with the accompanying drawing figures. It will be understood by skilled artisans that, consistent with common practice, the drawings are not necessarily drawn to scale and no conclusions regarding the invention should be drawn from measurements of the drawings. In fact, the thicknesses of the various layers of the valve generally have been greatly exaggerated in the figures for clarity of description.

DETAILED DESCRIPTION

Figure 1:
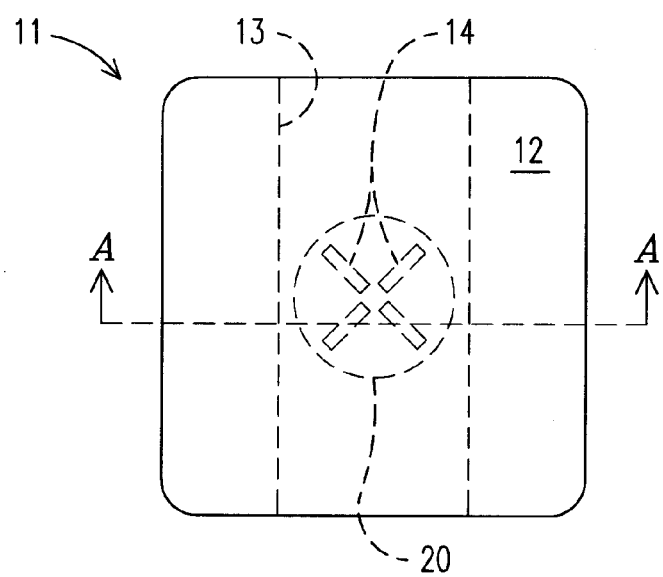
FIG. 1 is a top plan view of a gas release valve that embodies principles of the invention in a preferred form.
Figure 2:
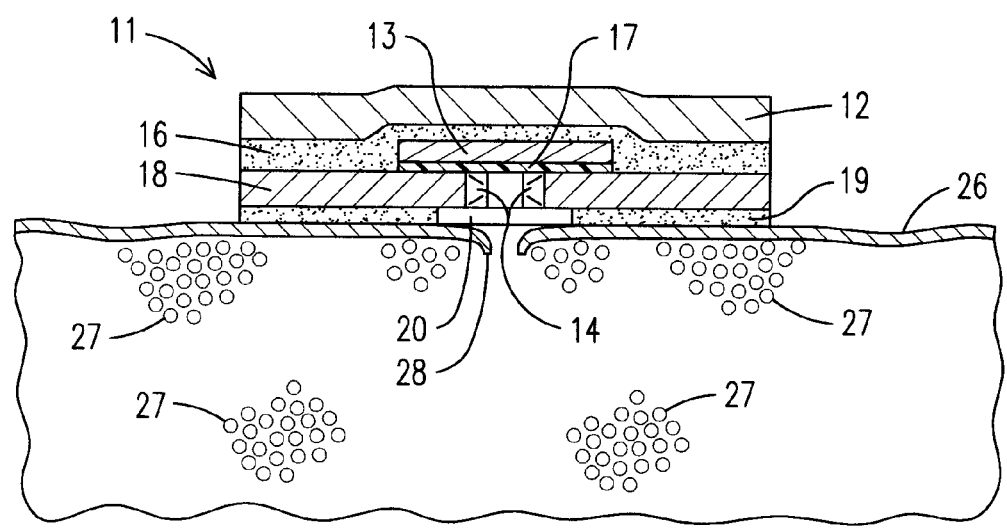
FIG. 2 is a cross-sectional view of the gas release valve of FIG. 1 taken along A-A of FIG. 1 and showing the valve affixed to the membrane end of a coffee container.

Referring now in more detail to the drawings, wherein like reference numerals indicate like parts throughout the several views, FIGS. 1 and 2 illustrate a one-way gas release valve that embodies principles of the invention in one preferred embodiment. The release valve 11 in this embodiment is generally square in shape and is configured as a multi-layer lamination incorporating a channel that opens when gas pressure within a coffee container, to the membrane end of which the valve is attached, rises above ambient pressure to release the excess gas pressure. When gas pressure within the container is less than ambient pressure, the channel is closed to prevent ingress of ambient air into the container.

More specifically, and with reference to FIGS. 1 and 2, the valve 11 is formed with a cover 12 that preferably is made of a metalized mPET material to provide structure and a protective barrier. A layer of adhesive 16, which may be double sided tape, is adhered to the underside of the cover 12. While double-sided tape is preferred, other types of adhesives such as, for instance, contact adhesives or pressure sensitive adhesives might be substituted to obtain substantially the same result.

A dry strap 13 is secured to the underside of the adhesive 16 and, as best seen in FIG. 1, extends across the width of the valve 11 from one side to the opposite side and has a width that is significantly less than the width of the overall valve 11. The dry strap preferably is formed as a strip of PET material, although other materials may be substituted if desired. In the preferred embodiment, the dry strap has a thickness of about 0.5 mil. A base 18, which also preferably is made of a PET film, is disposed beneath the dry strap 13 and is secured and laminated by the two strips of adhesive 16 on either side of the dry strap 13. In the preferred embodiment, the base is about 5 mils thick, although other thickness may be selected within the scope of the invention according to application specific requirements. Vent openings 14 are formed through the base in the central region of the valve 11 and are configured such that the vent openings are covered by the dry strap 13. In FIGS. 1 and 2, the vent openings are configured as 4 slits generally arranged in an X pattern, although, as detailed below, many other vent patterns may be selected. Further, the vent openings may comprise a pattern of perf cuts or slits in the base rather than completely cut-out sections and the term "vent patterns" includes such perf cuts and slits. Regardless of the pattern of the vent openings, the openings themselves preferably are formed to have dimensions smaller than that of a coffee grind for purposes described in more detail below.

A layer of adhesive 19, which in the preferred embodiment is a pressure sensitive adhesive, is disposed on the bottom surface of the base 18 and is formulated to adhere the valve 11 to the surface 26 of a coffee container's membrane end as shown. Surface 26 of the membrane end has a vent hole 28 punched therein and the valve 11 is attached to the membrane end with its vent openings substantially overlying the vent hole 28 in the membrane end. Significantly, an adhesive free area 20 is formed around the vent openings 14 in the base 18 of the valve. This ensures that the vent hole 28 in the membrane end is not sealed by the adhesive 19 and thus that gas pressure within the coffee container is provided a clear path through the vent hole 28 and vent openings 14 to be vented to ambience.

While the adhesive free area 20 is illustrated in the drawings as an area that contains no adhesive, it will be appreciated that the area 20 also may be an area in which the adhesive is rendered inactive and the vent openings are formed through the base and the inactive adhesive. This might be done chemically, or, for example, with a patch or covering applied to the adhesive in the region of the vent openings. The coffee container contains coffee grinds, which are represented for clarity by a few areas of grinds 27 in FIG. 2. As mentioned above, the vent openings 14 in the base of the valve each may be configured with dimensions that are less than the size of the coffee grinds within the container. In this way, stray grinds that might migrate through the vent hole 28 in the surface 26 of the membrane end cannot migrate further through the vent openings and into the space between the dry strap and the base, where they can result in failure of the valve. Accordingly, the vent openings form a filter against contamination of the valve by coffee grinds. Alternatively, the vent opening may comprise a hole as in the prior art, although the advantage of filtering coffee grinds may be significantly reduced by such a vent opening.

A thin coating of oil 17 is disposed between the bottom face of the dry strap 13 and the top surface of the base 18 on which it rests. The oil preferably is silicone oil, but other viscous oils and material might be used. The oil 17 functions to draw the lower face of the dry strap 13 and the upper surface of the base 18 together as a result of the surface tension of the oil. This, in conjunction with the wetting force provided by the coating of oil, provides a virtually complete sealing off of the vent openings 14 when the dry strap rests on the upper surface of the base.

However, excess gas pressure within the coffee container causes gas to vent through the vent hole 28 and induces a corresponding gas pressure within the vent openings 14 of the valve. When this gas pressure exceeds a predetermined relatively small threshold above ambient pressure, the force of the pressure pushes up on the dry strap, which breaks the seal facilitated by the oil 17 between the dry strap and the base. This, in turn, allows the gas from within the coffee container to flow beneath the dry strap to the edges of the valve, where it is vented to ambience. In this way, excess pressure within the coffee container is vented and, when the pressure equalizes with ambient pressure, the coating of oil 17 again seals the vent openings 14 to prevent outside air from seeping into the coffee container. When ambient pressure exceeds pressure within the coffee container, the force of the pressure is exerted on the cover 12 thus urging the dry strap down against the base, which enhances the seal against infiltration of ambient air.

Figure 3A:
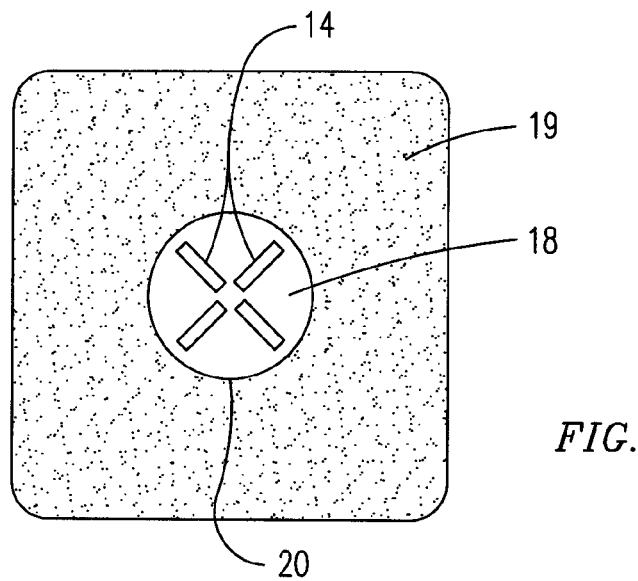
FIGS. 3a-3c are bottom plan views of the gas release valve of FIG. 1 illustrating possible vent patterns for preventing infiltration of coffee grinds into the valve.
Figure 3B:
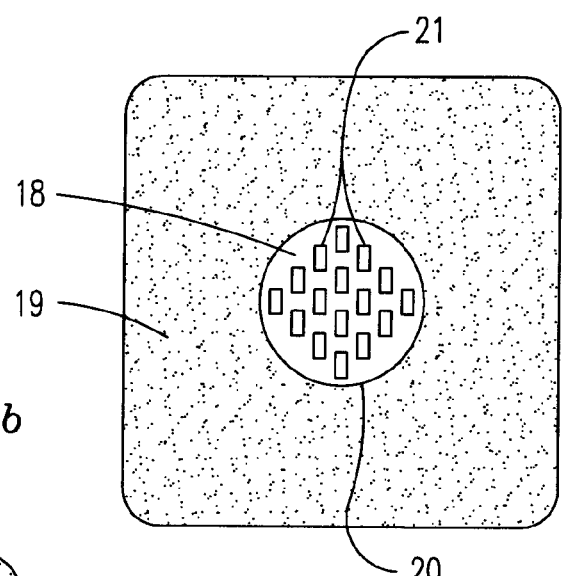
Figure 3C:
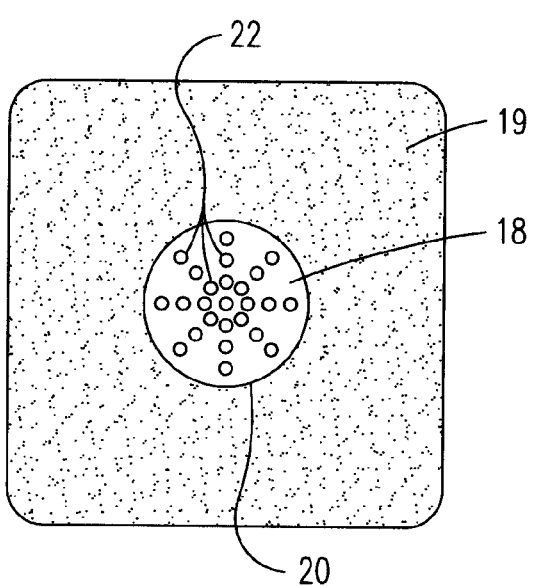

FIGS. 3a-3c are bottom plan views illustrating some possible embodiments of vent opening configurations according to the invention. It should be realized that the vent opening pattern of the invention is not limited in any way by the illustrated possibilities, but rather that multitudes of vent opening patterns might be selected so long as the vent openings allow excess gas pressure within a coffee container to generate sufficient upward force on the dry strap to break the seal and permit the excess gas to be vented. Indeed, a round opening as in the prior art valves might be selected if coffee grind filtration is not a goal. FIG. 3a illustrates four slits arrayed generally in an X pattern as shown in the preceding figures. The slits do not meet in the center since, if it were otherwise, flaps would be formed that might open up to permit migration of coffee grinds. The vent openings 14 are located within the adhesive free area 20 on the bottom of the base 18.

FIG. 3b illustrates vent openings that are patterned in a manner similar to a grate with an array of small rectangular openings 21 disposed in the base within the adhesive free area 20. FIG. 3c illustrates another possible vent opening pattern within the scope of the invention. Here, an array of small round openings 22 is arranged generally in a star pattern within the adhesive free area 20. Many other patterns and arrays of vent openings are possible, including slits or perf cuts. Indeed, a larger circular opening that may or may not be covered by a separate layer of small screen mesh might be used. Regardless of the pattern, it will be appreciated that arrays of vent openings sized to filter coffee grinds from entering the valve have heretofore not been possible because, as previously discussed, the oil coating has been applied to the dry strap through the opening in the base after the valves have been completed. Such vent opening arrays are possible because of the unique method of making the valves of this invention, which will now be discussed in more detail.

Figure 4:
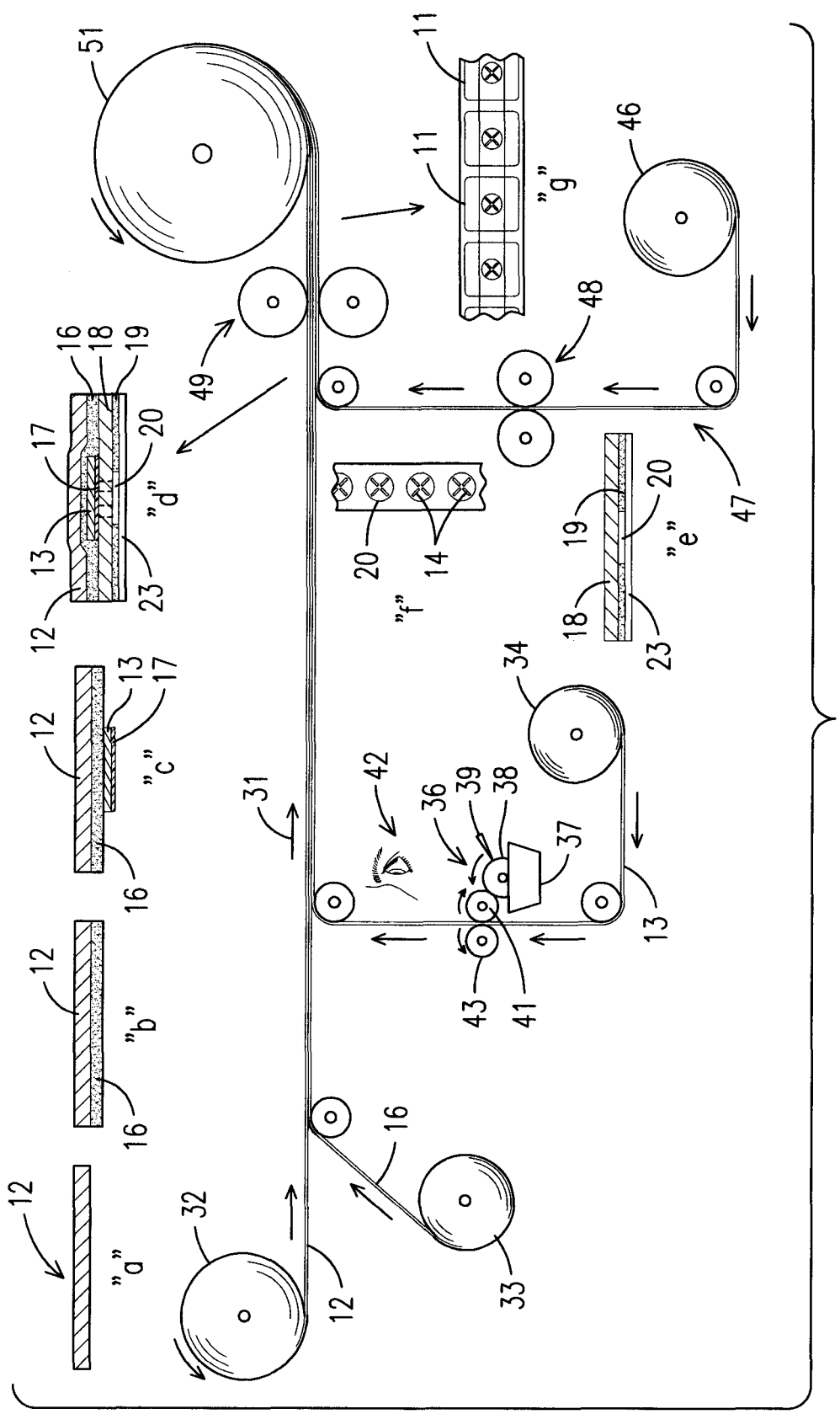
FIG. 4 is a functional schematic view illustrating a preferred method of making gas release valves according to the invention.

FIG. 4 illustrates one preferred method of making one-way gas release valves according to the invention. It will be understood that FIG. 4 is a functional flow diagram of a fabrication line and not a detailed schematic of the machinery used to perform these functions. Such machinery is generally known to those of skill in this art. Further, the method is illustrated for clarity as making a single row of gas release valves on a relatively narrow strip of the release material. The invention is not so limited, however, and it will be understood that the steps of this method can be applied to the fabrication of multiple rows of gas release valves across a wider strip if desired. In FIG. 4, cross sectional views of the lamination at various stages of the process are shown across the top of the figure and are identified with lower case letters.

Referring to FIG. 4, a strip of metalized mPET cover material 12 is drawn from a bulk supply 32 and progressively moved along a processing path 31 from an upstream end of the processing path on the left in FIG. 4 to a downstream end thereof on the right in FIG. 4. A strip of adhesive 16, which preferably is a strip of double-sided tape, is drawn from a bulk supply 33 and advanced toward engagement with the underside of the strip of mPET cover material 12. The strip of adhesive 16 contacts and bonds to the underside of the mPET cover material forming a first lamination, which may be referred to as a first pre-lamination, as depicted at "b" above the processing path in FIG. 4. A ribbon of dry strap material 13, which preferably comprises PET, is drawn from a bulk supply 34 and directed along a path generally bringing the strip toward the processing path 31. The ribbon of dry strap material 13 is narrower than the strip of mPET cover material and narrower than the strip of double-sided tape adhesive 16.

As the ribbon of dry strap material 13 advances toward the processing path, a thin layer or film of oil such as silicone oil is applied to what will become the underside of the ribbon of dry strap material. The oil is applied at an oil application station using a precisely metered application technique to insure that a very thin film of oil is applied uniformly and with precision all along the length of the dry strap ribbon. In the illustrated embodiment, this technique comprises a gravure applicator; however, other application techniques may be used such as an analox applicator or even a spray application or a brush application that is precisely controlled. Gravure application of inks and other materials is well known and need not be described in great detail here. However, the gravure applicator of the illustrated embodiment generally comprises an oil fountain 37 within which a rotating gravure cylinder is immersed. The surface of the cylinder is configured to pick up oil from the fountain as the cylinder rotates and a doctor blade 39 removes excess oil from the cylinder to leave a very precise amount of oil on the surface of the cylinder. A transfer roller 41 picks up oil from the gravure cylinder and the ribbon of dry strap material 13 moves between the transfer roller 41 and a pinch roller 43.

As the ribbon passes between the transfer and pinch rollers, a very thin film of the oil is applied to the ribbon from the transfer roller. As is the nature of gravure application, this film of oil is applied in very precise quantities, very evenly across the surface of the ribbon, and very consistently along the length of the ribbon. For instance, precisely 2.9 mg (or another preselected quantity) of oil per unit length may be applied, where the unit length is the width of the finished gas release valves being made. As the ribbon of dry strap material 13 leaves the oil application station 36, a machine vision system 42 can be positioned to observe the layer of oil applied to the ribbon. The vision system is coupled to a computer-based controller that is programmed to convert the images of the vision system to quality assurance data that can be used to verify that the oil is evenly applied to the ribbon in precisely the correct quantities.

Once the oil is applied to the ribbon of dry strap material 13 and its application is verified by the vision system 42, the oiled dry strap is brought into engagement with the advancing lamination "b" with the oiled surface of the dry strap facing downwardly in the illustrated embodiment. The upper surface of the dry strap, which is not oiled, adheres to the exposed surface of the double-sided tape 16 to form lamination "c" illustrated above the processing path. More specifically, lamination "c" now includes the mPET cover material 12, the double-sided tape adhesive 16, the dry strap 13 adhered to the adhesive 16, and a thin film of oil 17 on the exposed face of the dry strap. In the illustrated embodiment, the oiled dry strap is positioned approximately in the center between the edges of the lamination "b" so that strips of adhesive 16 remain exposed on either side of the dry strap as shown.

Referring to the lower right in FIG. 4, a ribbon of a lower or second pre-lamination 47 is drawn from a bulk supply 46 and advanced generally toward the processing path 31. The pre-lamination 47 has been previously fabricated in a separate process (not shown) and its structure is generally illustrated at "e" in the figure. More specifically, the second pre-lamination 47 is made up of a strip of base material 18, which preferably is a PET material, having a pressure sensitive adhesive 19 applied thereto. A release strip 23 is applied to the pressure sensitive adhesive to protect its exposed surface until such time as gas release valves (shown at "g") are pulled away from the release strip to be applied to membrane ends of coffee containers. In the embodiment shown in FIG. 4, a small section of the pressure sensitive adhesive 19 has been previously removed (or not applied) at spaced intervals along the length of the second pre-lamination 47 to form adhesive free areas 20 spaced along the bottom of the base 18. It should be understood; however, that these adhesive free areas can just as well be formed with a die as part of the illustrated process after the pre-lamination 47 is drawn from the supply 46. Indeed, as mentioned above, the adhesive free areas 20 need not be areas where adhesive has been removed or is not present. Alternatively, the adhesive may simply be rendered inactive in these areas, either by application of a chemical deactivator or by application of permanent non-adhesive discs or patches in the adhesive free areas. Thus, the adhesive free areas 20 should be thought of as areas where there is no adhesive activity for whatever reason.

As the second pre-lamination moves toward the processing path, it passes through a die cutter 48 or slitter that is configured to cut vent openings through the pre-lamination in the adhesive free areas 20, as illustrated at "f." Here, the vent openings are configured in an X pattern as illustrated in FIG. 3a; however, any other appropriate vent pattern such as those shown in FIGS. 3b and 3c or otherwise might be formed in the pre-lamination 47. With the vent openings die-cut, the pre-lamination 47 is moved into engagement with the lamination "c" moving along the processing path 31. Since the double sided tape adhesive 16 is exposed on either side of the dry strap, the base 18 of the pre-lamination sticks and adheres to the adhesive 16 to form lamination "d" at the upper part portion of FIG. 4. The lamination "d" thus comprises an mPET cover layer 12, an adhesive layer 16 (formed of the double sided tape), a centered PET dry strap 13, a PET base 18, and a pressure sensitive adhesive layer 19, all supported on a release strip 23. Further, the dry strap 13 is sized and positioned to overly and cover the vent openings 14 in the base 18, and a thin film of oil 17 is disposed between the dry strap and the base to facilitate a seal, as discussed above. The basic lamination structure of the gas release valves is thus formed.

With the basic lamination complete, it is moved through a die cutter 49, which includes cutters that align with the adhesive free areas 20 and vent openings 14 and "kiss cut" the lamination down to the release layer 23 to form a row of gas release valves 11 along and supported by the release layer. In this embodiment, the valves are generally square in shape, but may be cut to take on a variety of shapes. Since the valves are kiss cut, they remain attached to the release strip 23 and therefore the resulting strip of gas release valves can be rolled onto a bulk storage roll 51. The bulk storage roll can then be used in the traditional way to apply individual gas release valves to the membrane ends of coffee containers in a separate machine and operation.

A variety of modifications of the just described methodology may be made by skilled artisans without departing from the scope of the invention. One variation, for example, might be to form a first or lower pre-lamination comprising a release liner, a pressure sensitive adhesive, and a base. A second or upper pre-lamination might be formed comprising an mPET cover, a double sided adhesive, and a dry strap. In such a modification, the oil can be printed or otherwise applied on the base in a strip that will underlie the dry strap. Vent openings can be formed in the lower pre-lamination, whereupon the upper and lower pre-laminations may be brought into contact and laminated together. The valves can then be kiss cut from the resulting laminated strip as discussed above. It will thus be seen that the sequence in which the steps of the process are performed may be altered from the exemplary embodiment detailed above, as well at the location at which and surface to which the oil is applied, so long as the oil is applied as a part of the valve fabrication process, resides between the dry strap and the base, and is not applied after the valves are complete as has heretofore been the case. The invention is not intended to be limited to any particular sequence of steps or oil application strategy.

It will thus be seen that the method of making gas release valves according to the present invention forms valves that are pre-oiled with an amount and coverage of oil between the dry strap and the base that is precisely controllable and determinate. Thus, variations in performance of the valves due to inconsistent application of oil through holes in the base after fabrication, as has been the case in the past, are virtually eliminated. Further and advantageously, the elimination of the need to spray oil through holes in the base permits, in place of a hole (even thought a hole may still be used if desired), vent openings in patterns that form a filter for preventing coffee grinds from entering the valve and hindering its function. Accordingly, not only is an improved process provided that standardizes valve performance, but the valve can now perform the inherent function of preventing debris from entering and clogging the valve during use.

The invention has been described herein in terms of preferred embodiments and methodologies considered by the inventor to represent the best mode of carrying out the invention. It will be clear to those of skill in the art, however, that a wide variety of additions, deletions, and modifications might well be made to the illustrated embodiments without departing from the spirit and scope of the invention, which is delineated only by the claims.

What is claimed is:

1. A gas release valve comprising:
a base having a width and a peripheral edge;
a cover overlying the base and having a width and a peripheral edge adjacent the peripheral edge of the base;
a dry strap disposed between the base and the cover and having a width less than the width of the base and the width of the cover and at least one end exposed to ambience between the adjacent peripheral edges of the base and the cover;
oil disposed between the dry strap and the base; and
a vent pattern formed through the base underlying the dry strap;
the vent pattern configured to inhibit particulates from entering the gas release valve.

2. A gas release valve as claimed in claim 1 and wherein the vent pattern comprises a plurality of openings arranged in a predetermined array.

3. A gas release valve as claimed in claim 2 and wherein the predetermined array is a diamond pattern.

4. A gas release valve as claimed in claim 2 and wherein the predetermined array is a cross pattern.

5. A gas release valve as claimed in claim 2 and wherein the predetermined array is a circular pattern.

6. A gas release valve as claimed in claim 1 and further comprising an adhesive on the base for securing the gas release valve to a surface.

7. A gas release valve as claimed in claim 1 and wherein the cover comprises a layer of cover material and a layer of adhesive contacting a top of the dry strap and contacting the base on either side of the dry strap.

8. A gas release valve as claimed in claim 1 and wherein the base and the dry strap comprise PET.

9. A gas release valve as claimed in claim 6 and wherein the cover comprises mPET.

10. A gas release valve as claimed in claim 1 and wherein the base and the cover have a length in a direction transverse to the width of the base and the cover, and wherein the dry strap has a length between ends that is substantially the same as the length of the base and the cover.

11. A gas release valve as claimed in claim 10 and wherein the oil is disposed continuously from end to end along the length of the dry strap.

12. A gas release valve as claimed in claim 1 and further comprising a strip of adhesive disposed between the base and the cover on either side of the dry strap.

13. A gas release valve comprising:
a base having a width;
a cover having a width and overlying the base;
a dry strap disposed between the base and the cover and having a width less than the width of the base and the width of the cover;
an adhesive adhering the cover to the dry strap and adhering the cover to the base on either side of the dry strap;
oil disposed between the dry strap and the base; and
a vent pattern formed through the base underlying the dry strap, the vent pattern being configured to inhibit particulates from entering the gas release valve.

14. A gas release valve as claimed in claim 13 and further comprising an adhesive on the base for securing the gas release valve to a surface.

15. A gas release valve as claimed in claim 13 and wherein the base and the dry strap comprise PET.

16. A gas release valve as claimed in claim 13 and wherein the cover comprises mPET.

* * * * *